United States Patent
Umeyama et al.

(10) Patent No.: US 10,658,665 B2
(45) Date of Patent: May 19, 2020

(54) LITHIUM ION SECONDARY BATTERY HAVING A NEGATIVE ELECTRODE ACTIVE MATERIAL FORMED OF A GRAPHITE MATERIAL AND A CONDUCTIVE CARBON MATERIAL DIFFERENT FROM THE GRAPHITE MATERIAL

(71) Applicant: TOYOTA JIDOSHA KABUSHIKI KAISHA, Toyota-shi, Aichi (JP)

(72) Inventors: Hiroya Umeyama, Okazaki (JP); Koji Torita, Nagoya (JP); Akihiro Taniguchi, Ashiya (JP); Shuji Tsutsumi, Ikoma (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 332 days.

(21) Appl. No.: 15/273,981

(22) Filed: Sep. 23, 2016

(65) Prior Publication Data

US 2017/0092951 A1  Mar. 30, 2017

(30) Foreign Application Priority Data

Sep. 29, 2015 (JP) .................................. 2015-191845
Jun. 3, 2016 (JP) .................................. 2016-111391

(51) Int. Cl.
| | | |
|---|---|---|
| H01M 4/00 | (2006.01) | |
| H01M 4/587 | (2010.01) | |
| H01M 4/133 | (2010.01) | |
| H01M 4/62 | (2006.01) | |
| H01M 10/0525 | (2010.01) | |
| H01M 10/0587 | (2010.01) | |
| H01M 4/02 | (2006.01) | |

(52) U.S. Cl.
CPC .......... *H01M 4/587* (2013.01); *H01M 4/133* (2013.01); *H01M 4/625* (2013.01); *H01M 10/0525* (2013.01); *H01M 10/0587* (2013.01); *H01M 2004/027* (2013.01); *H01M 2220/20* (2013.01); *Y02T 10/7011* (2013.01)

(58) Field of Classification Search
CPC ...... H01M 4/587; H01M 4/133; H01M 4/625; H01M 10/0525; H01M 10/0587; H01M 2004/027; H01M 2220/20
See application file for complete search history.

(56) References Cited

U.S. PATENT DOCUMENTS

| | | | |
|---|---|---|---|
| 6,806,003 B1 | 10/2004 | Yamaguchi et al. | |
| 9,450,246 B2 * | 9/2016 | Takahashi | H01M 4/587 |
| 2002/0119371 A1 * | 8/2002 | Haug | H01M 4/13 429/217 |
| 2003/0054243 A1 * | 3/2003 | Suzuki | H01M 4/13 429/188 |
| 2013/0164618 A1 * | 6/2013 | Konishi | H01M 4/133 429/217 |
| 2014/0134492 A1 * | 5/2014 | Yamami | H01M 4/587 429/223 |

FOREIGN PATENT DOCUMENTS

| | | | |
|---|---|---|---|
| CN | 1301052 A | 6/2001 | |
| CN | 103326027 A | 9/2013 | |
| CN | 103620836 A | 3/2014 | |
| JP | 2000-348719 A | 12/2000 | |
| JP | 2002-231316 A | 8/2002 | |
| JP | 2009-211956 A | 9/2009 | |
| JP | 2014-170724 A | 9/2014 | |
| WO | WO 2011/052452 * | 5/2011 | ............. H01M 4/36 |
| WO | 2013/002162 A1 | 1/2013 | |

* cited by examiner

*Primary Examiner* — Raymond Alejandro
(74) *Attorney, Agent, or Firm* — Sughrue Mion, PLLC

(57) ABSTRACT

A lithium ion secondary battery, improved in durability against high-rate charging/discharging, which includes, in the negative electrode active material layer, a negative electrode active material formed of a graphite carbon material having a graphite structure in at least a part thereof, and a conductive carbon material, which is different from the graphite carbon material and is formed of a conductive amorphous carbon. The negative electrode active material has a bulk density of 0.5 g/cm³ or more and 0.7 g/cm³ or less, and a BET specific surface area of 2 m²/g or more and 6 m²/g or less. The conductive carbon material has a bulk density of 0.4 g/cm³ or less, and a BET specific surface area of 50 m²/g or less.

10 Claims, 1 Drawing Sheet

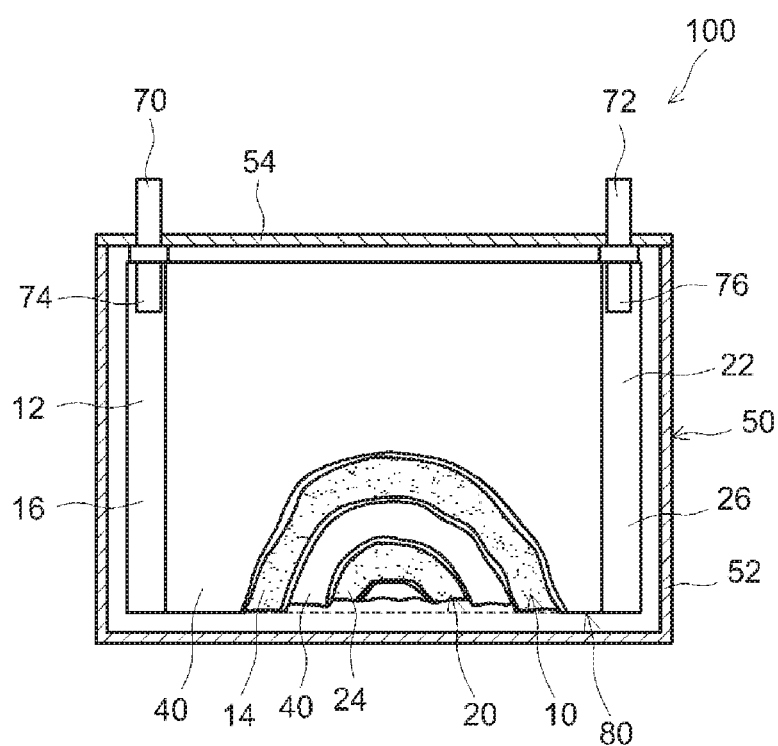

LITHIUM ION SECONDARY BATTERY HAVING A NEGATIVE ELECTRODE ACTIVE MATERIAL FORMED OF A GRAPHITE MATERIAL AND A CONDUCTIVE CARBON MATERIAL DIFFERENT FROM THE GRAPHITE MATERIAL

BACKGROUND OF THE INVENTION

1. Field of the Invention

The present teaching relates to a lithium ion secondary battery. Incidentally, the present application claims priority based on Japanese Patent Application No. 2015-191845 filed on Sep. 29, 2015, and Japanese Patent Application No. 2016-111391 filed on Jun. 3, 2016, and the entire contents of the applications are incorporated herein by reference in the present specification.

2. Description of the Related Art

In recent years, lithium ion secondary batteries are light in weight, and can provide a high energy density, and hence have been growing in importance as on-vehicle power sources, or power sources for personal computers and portable terminals. Particularly, lithium ion secondary batteries have found a wider range of use as power sources for driving motors to be mounted on vehicles (which will be hereinafter referred to as vehicle driving power sources).

Incidentally, so-called high-rate charging/discharging in which charging and discharging are performed with a large current for a short time is performed with a lithium ion secondary battery to be mounted on a vehicle such as a car, and to be used as a vehicle driving power source. During the period in which such high-rate charging/discharging is carried out, in the electrodes (the positive electrode and the negative electrode) of the lithium ion secondary battery, sharp insertion or desorption of lithium ions of electric charge carriers, and the like result in a change in structure of the electrode active material. This may cause expansion or shrinkage (expansion and shrinkage will be hereinafter collectively referred to as "expansion/shrinkage") of the electrode active material layer. Such expansion/shrinkage of the electrode active material layer may cause the non-aqueous electrolyte included in the electrode to leak out of the electrode (particularly, the electrode active material layer).

Particularly, with a lithium ion secondary battery including a graphite type carbon material as a negative electrode active material, the degree of expansion/shrinkage of the negative electrode active material layer during high-rate charging/discharging is large. Thus, the non-aqueous electrolyte tends to readily leak out. Such leakage of the non-aqueous electrolyte from the negative electrode means that the lithium salt included in the leaking electrolyte also leaks together. This incurs a fear of the reduction of the lithium salt concentration in the negative electrode active material layer.

Further, the leakage of the electrolyte and the reduction of the lithium salt concentration entailed by expansion/shrinkage of the negative electrode active material layer cause a lithium salt concentration variation at the surface and inside the negative electrode (negative electrode active material layer). When such a lithium salt concentration variation (particularly, the concentration variation in the plane direction of the negative electrode) is caused, large-resistance points are formed spotwise in the negative electrode active material layer. This is not desirable in that the degradation of the battery performances, such as the degradation of the cycle characteristic (durability) and an increase in internal resistance, is caused.

In this regard, for example, Japanese Patent Application Laid-open No. 2002-231316 discloses a lithium ion secondary battery characterized in that a low-crystallinity carbon material having a lattice spacing (d002) of 0.372 nm to 0.400 nm is used as the negative electrode active material. Then, Japanese Patent Application Laid-open No. 2002-231316 describes the following: the low-crystallinity carbon material originally has a crystal structure with a lattice spacing (d002) of 0.372 nm or more when lithium is inserted into graphite; accordingly, the negative electrode active material (the low-crystallinity carbon material) does not repeat expansion/shrinkage even during charging/discharging of the battery, resulting in a favorable cycle characteristic.

SUMMARY OF THE INVENTION

However, the lithium ion secondary battery including such a low-crystallinity carbon material as described in the Japanese Patent Application Laid-open No. 2002-231316 as the negative electrode active material has been developed on the assumption that charging/discharging by a relatively lower rate current is performed. Thus, it was not possible to sufficiently improve the durability when charging/discharging at a particularly high rate required of the lithium ion secondary battery as a vehicle driving power source, such as a rate as very high as 5 C or more is performed.

Under such circumstances, the present teaching was created to solve the related-art problem with a lithium ion secondary battery. It is an object thereof to provide a lithium ion secondary battery more effectively improved in durability against such high-rate charging/discharging as to be required of a lithium ion secondary battery as a vehicle driving power source (high-rate cycle characteristic).

The present inventors focused attention on the relationship between the properties of the negative electrode active material and the conductive material included in the negative electrode active material layer of the lithium ion secondary battery, and the battery performances.

Then, the present inventors found the following: when the bulk density of the carbon material formed of amorphous carbon as the conductive material included in the negative electrode active material layer (which will be also hereinafter referred to as a "conductive carbon material") is smaller than the bulk density of the graphite type carbon material as the negative electrode active material, the pore volume in the negative electrode active material layer relatively tends to increase, resulting in an increase in diffusion rate of lithium ions in the negative electrode active material layer. In the negative electrode active material layer with such a configuration, lithium ions are smoothly supplied to the electrode body, and lithium ions become more likely to be diffused inside the electrode body. For this reason, even when high-rate charging/discharging is performed, the lithium salt concentration variation is suppressed. Therefore, the durability against high-rate charging/discharging can be expected to be improved.

However, on the other hand, the present inventors found the following: even in the case where the bulk density of the conductive carbon material is smaller than the bulk density of the negative electrode active material (graphite type carbon material), when the specific surface area of the conductive carbon material is too large, an undesirable side reaction (e.g., the decomposition reaction of the electrolyte in the negative electrode active material layer during charging) is promoted during charging/discharging. This rather results in a reduction of the durability against high-rate charging/discharging (high-rate cycle characteristic).

In accordance with the present teaching, the durability of the lithium ion secondary battery against high-rate charging/discharging is improved by new approach of taking measures to resolve or relieve the lithium salt concentration variation based on various findings regarding the properties of the negative electrode active material and the conductive material included in the negative electrode active material layer of such a lithium ion secondary battery.

In order to achieve the foregoing object, the present teaching provides a lithium ion secondary battery which includes an electrode body including a positive electrode provided with a positive electrode active material layer on a positive electrode collector, and a negative electrode provided with a negative electrode active material layer on a negative electrode collector, and a non-aqueous electrolyte.

In the lithium ion secondary battery herein disclosed, the negative electrode active material layer includes a negative electrode active material formed of a graphite type carbon material having a graphite structure in at least a part thereof, and a conductive carbon material, which is different from the graphite type carbon material and is formed of a conductive amorphous carbon. Herein, the negative electrode active material has a bulk density of 0.5 g/cm$^3$ or more and 0.7 g/cm$^3$ or less, and a BET specific surface area of 2 m$^2$/g or more and 6 m$^2$/g or less.

Then, the conductive carbon material has a bulk density of 0.4 g/cm$^3$ or less, and a BET specific surface area of 50 m$^2$/g or less.

With the lithium ion secondary battery in such a configuration, it is possible to ensure an appropriate pore volume (porosity) while suppressing the occurrence of the side reaction during high-rate charging/discharging in the negative electrode active material layer (e.g., the decomposition reaction of the electrolyte in the negative electrode active material layer during charging).

For this reason, even when the structure of the graphite type carbon material of the negative electrode active material is changed during high-rate charging/discharging involving sharp insertion or desorption of lithium ions, it is possible to reduce the degree of expansion/shrinkage of the negative electrode active material layer due to the change in structure. Further, the diffusion of lithium ions in the negative electrode active material layer is promoted. For this reason, it is possible to suppress the lithium salt concentration variation in the plane direction of the negative electrode.

Therefore, with the lithium ion secondary battery in the present configuration, it is possible to achieve a high durability against high-rate charging/discharging (high-rate cycle characteristic). For example, with the lithium ion secondary battery in the present configuration, it is possible to suppress the increase in internal resistance even in the use mode in which high-rate charging/discharging is repeated.

A desired mode of the lithium ion secondary batten herein disclosed is characterized in that the content of the conductive carbon material in the negative electrode active material layer is 2 parts by mass or more and 10 parts by mass or less based on the total solid content of the negative electrode active material layer taken as 100 parts by mass.

When the content (mixing ratio) of the conductive carbon material formed of the conductive amorphous carbon in the negative electrode active material layer falls within the range, it is possible to achieve compatibility between the suppression of the lithium salt concentration variation, and the suppression of the reduction of the battery capacity (discharge capacity) due to addition of the conductive carbon material to the negative electrode active material layer in a good balance.

Further, in a desired mode, the conductive carbon material is at least one kind of carbon black.

Various carbon blacks have favorable conductivity. Further, control of the particle size and the structure (the lump of a plurality of connected particles) enables the adjustment of the bulk density and the BET specific surface area within respective proper ranges. For this reason, carbon black is a conductive carbon material formed of conductive amorphous carbon desirable for achieving the object of the present teaching.

Whereas, when the conductive carbon material is carbon black, desirably, the conductive carbon material is furnace black, and the furnace black has a bulk density of 0.02 g/cm$^3$ or more and 0.04 g/cm$^3$ or less.

When the furnace black having a bulk density within such a range is used as carbon black of a conductive carbon material, the sites at which the furnace black surface and the electrolyte are in contact with each other specifically increase in number sharply. Accordingly, the furnace black comes to exhibit the function as the negative electrode active material. Namely, the furnace black having a bulk density within such a range exhibits not only the function as the conductive material (conductive carbon material), but also the function as the negative electrode active material. For this reason, it is possible to suppress the reduction of the battery capacity due to the addition of the conductive carbon material.

Further, in the furnace black having a bulk density within such a range, particles tend to be connected to one another. This results in the formation of a large structure in which furnace black particles are connected to one another. The structure functions as a skeleton in the negative electrode active material layer. As a result, the coating film density decreases, and the pore volume of the negative electrode increases. This promotes the diffusion of lithium ions in the negative electrode plane, which suppresses the occurrence of the salt concentration variation of the electrolyte. Accordingly, the increase in resistance can be suppressed at a high level, so that the high-rate cycle characteristic can be further improved.

Further, a desired aspect is characterized in that the positive electrode collector and the negative electrode collector are long sheet-shaped positive electrode sheet and negative electrode sheet, respectively, and in that the electrode body is a wound electrode body in which the positive electrode sheet and the negative electrode sheet are stacked with a separator interposed therebetween and wound.

The wound electrode body has a structure in which the non-aqueous electrolyte easily leaks from the electrode body by expansion/shrinkage of the electrode (particularly, the negative electrode) during high-rate charging/discharging (particularly, the wound electrode body formed in a flat shape), and hence, is suitable as an electrode body (and a lithium ion secondary battery including the wound electrode body) to which the present teaching is applied.

As described above, the lithium ion secondary battery herein disclosed is provided as the one excellent in battery characteristics such as high-rate cycle characteristic (e.g., suppression of an increase in internal resistance). Therefore, by taking advantage of such characteristics, the lithium ion secondary battery can be suitably used as, for instance, the power source (vehicle driving power source) of a hybrid car, a plug-in hybrid car, or the like.

BRIEF DESCRIPTION OF THE DRAWING

FIG. 1 is a view for schematically illustrating the internal configuration of a lithium ion secondary battery in accordance with one embodiment.

DESCRIPTION OF THE PREFERRED EMBODIMENTS

Below, a desired embodiment of a lithium ion secondary battery herein disclosed will be described. Incidentally, matters other than matters particularly mentioned in this specification, and required for practicing the present teaching can be understood as the design matters of those skilled in the art based on the related art in the present field. The present teaching can be practiced based on the contents disclosed in the present specification and common technical knowledge in the present field.

Below, the desired embodiments of the present teaching will be described by taking a lithium ion secondary battery in a form in which a flat wound electrode body and a non-aqueous electrolyte are accommodated in a container in the corresponding flat shape (box shape) as an example. The dimensional relationships (in length, width, thickness, and the like) in the drawing do not necessarily reflect the actual dimensional relationships.

In the present specification, the term "lithium ion secondary batteries" include repeatedly chargeable and dischargeable batteries general in which for example, using lithium ions as electrolyte ions (electric charge carriers), charging and discharging are implemented by transfer of electric charges associated with lithium ions between the positive and negative electrodes. The batteries commonly referred to as lithium ion batteries and lithium secondary batteries are typical examples included in the lithium ion secondary batteries in the present specification.

Further, in the present specification, the term "bulk density (g/cm$^3$)" regarding the conductive carbon material (conductive material), or the graphite type carbon material (negative electrode active material) denotes the result of the measurement with the measurement method according to "JIS K6219-2:2015".

On the other hand, in the present specification, the term "BET specific surface area (m$^2$/g)" regarding the conductive carbon material (conductive material), or the graphite type carbon material (negative electrode active material) denotes the result of the measurement with the measurement method according to "JIS K6217-7:2013".

As shown in FIG. 1, a lithium ion secondary battery 100 in accordance with the present embodiment includes a case 50 made of metal (also suitably, made of resin or a laminated film). The case (outer container) 50 includes a case main body 52 in a flat rectangular parallelepiped shape with the top end opened, and a lid body 54 closing the opening.

The top surface (i.e., the lid body 54) of the case 50 is provided with a positive electrode terminal 70 to be electrically connected with a positive electrode 10 of a wound electrode body 80, and a negative electrode terminal 72 to be electrically connected with a negative electrode 20. In the inside of the case 50, the flat wound electrode body 80 in which the long sheet-shaped positive electrode (positive electrode sheet) 10 and the long sheet-shaped negative electrode (negative electrode sheet) 20 are stacked with a total of two long sheet-shaped separators (separator sheets) 40 interposed therebetween and wound is accommodated with a non-aqueous electrolyte.

The lid body 54 is provided with a gas discharge mechanism such as a safety valve for discharging the gas generated in the case 50 to outside the case 50 as with this kind of lithium ion secondary batteries in the related art. This configuration, however, does not feature the present teaching, and hence is not shown and its explanation is omitted.

In the positive electrode sheet 10, a positive electrode active material layer 14 including a positive electrode active material (a substance capable of occluding and releasing lithium ions) as a main component is provided on both surfaces of the long sheet-shaped positive electrode collector 12. However, the positive electrode active material layer 14 is not provided at one side edge in the width direction of the direction orthogonal to the longitudinal direction of the positive electrode sheet 10 (i.e., one end in the winding axis direction). This results in the formation of a positive electrode active material layer non-formation part 16 in which the positive electrode collector 12 is exposed with a given width.

The lithium ion secondary battery herein disclosed has no particular restriction on the contents of the positive electrode active material. It is possible to use, for example, one, or two or more compounds commonly used for a lithium ion secondary battery in the related art. For example, it is possible to use particles of lithium transition metal composite oxide of a layered crystal structure or a spinel type crystal structure, lithium transition metal compounds of a polyanion type (e.g., olivine type), and the like. Desirable examples of the typical positive electrode active material may include lithium transition metal composite oxides including Li and at least one transition metal element (desirably, at least one of Ni, Co, and Mn). There is used, for example, a positive electrode active material (particle) formed of a composite oxide such as LiNiO$_2$ or LiCoO$_2$, or a ternary positive electrode active material (NCM lithium composite oxide) such as LiNi$_{1/3}$Co$_{1/3}$Mn$_{1/3}$O$_2$. Further, the positive active material may include at least one element of elements such as W, Zr, Nb, Mg, Ca, Na, Fe, Cr, Zn, Si, Sn, Al, B, and F.

Although not particularly restricted, the ratio of the positive electrode active material based on the total solid content of the positive electrode active material layer is desirably set at 70 to 97 mass % (e.g., 75 to 95 mass %).

Incidentally, the positive electrode active material (particle) to be used may be a positive electrode active material (hollow particle) of a so-called hollow structure having a shell part and a hollow part formed in the inside thereof, or may be a positive electrode active material (solid particle) of a so-called solid structure not having such a hollow part. The positive electrode active material particle of a hollow structure can perform substance exchange (e.g., transfer of Li ions) with the non-aqueous electrolyte more efficiently than the positive electrode active material particle of a solid structure, and hence is desirable.

The positive electrode active material particle (secondary particle) desirably has an average particle size (the measurement value based on the laser diffraction/scattering method) of about 1 μm or more and 25 μm or less. The positive electrode active material particle having such an average particle size allows favorable battery performances to be exhibited with more stability.

The positive electrode active material layer 14 can be formed in the following manner: the positive electrode active material (such as NCM lithium composite oxide) is mixed with various additives to prepare a composition (e.g., a slurry-like composition prepared by adding a non-aqueous solvent thereto, or a granule obtained by granulating a positive electrode active material with an additive); and the resulting composition is deposited on the positive electrode collector 12 with a prescribed thickness.

Examples of the additive may include a conductive material. As the conductive material, a carbon material such as a carbon powder or a carbon fiber is desirably used. As other additives, mention may be made of various polymer materials capable of functioning as binders (bonding materials). For example, polymers such as polyvinylidene fluoride (PVDF) and polyvinylidene chloride (PVDC) can be desirably adopted. Alternatively, styrene butadiene rubber (SBR), polytetrafluoroethylene (PTFE), polyethylene (PE), polyacrylic acid (PAA), and the like may be used.

The negative electrode sheet 20 also has the following configuration as with the positive electrode sheet 10: a negative electrode active material layer 24 including a negative electrode active material (graphite type carbon material) as a main component is provided on both surfaces of the long sheet-shaped negative electrode collector. However, the negative electrode active material layer 24 is not provided at one side edge in the width direction of the negative electrode sheet 20 (i.e., one end in the winding axis direction, opposite to the positive electrode active material layer non-formation part 16). This results in the formation of a negative electrode active material layer non-formation part 26 at which the negative electrode collector 22 is exposed with a given width.

In the lithium ion secondary battery herein disclosed, a graphite type carbon material having a graphite structure in at least a part thereof is used as the negative electrode active material. The material has a graphite structure, and hence has a favorable function as an active material capable of occluding (inserting) and releasing lithium ions. As the graphite type carbon materials, there can be adopted those obtained by forming various graphite materials such as natural graphite and artificial graphite into a spherical or flake shape. The material formed into a spherical shape is desirable.

Further, in order to improve the insertion efficiency of lithium ions into the negative electrode active material (graphite type carbon material), it is desirable to use an amorphous carbon-coated graphite type carbon material in which at least a part of the surface of the graphite type carbon material (particle) is coated with amorphous carbon. The amorphous carbon-coated graphite type carbon material can be prepared in the following manner: particles of the graphite type carbon material, and a material capable of forming an amorphous carbon layer (e.g., pitches such as petroleum pitches) are kneaded, and fired at a high-temperature range (e.g., 500° C. or more and 1500° C. or less).

The negative electrode active material (graphite type carbon material) to be used properly has a bulk density of 0.5 g/cm$^3$ or more and 0.7 g/cm$^3$ or less. Such a bulk density is desirably 0.56 g/cm$^3$ or more and 0.62 g/cm$^3$ or less. It is particularly desirable to use a graphite type carbon material having a bulk density of 0.6 g/cm$^3$ and therearound (e.g., about 0.6±0.1 g/cm$^3$).

Further, the negative electrode active material (graphite type carbon material) to be used properly has a BET specific surface area of 2 m$^2$/g or more and 6 m$^2$/g or less. Such a BET specific surface area is desirably 3 m$^2$/g or more and 5 m$^2$/g or less. It is particularly desirable to use a graphite type carbon material having a BET specific surface area of 4 m$^2$/g and therearound (e.g., about 4±0.1 m$^2$/g).

The graphite type carbon material for use as the negative electrode active material has no particular restriction on the desirable size (the particle size of the secondary particle). For example, it is possible to desirably use the material having an average particle size of the measurement value based on the laser diffraction/scattering method of about 1 μm or more and 50 μm or less (typically, 5 μm or more and 20 μm or less, and desirably 8 μm or more and 12 μm or less).

Although not particularly restricted, the ratio of the negative electrode active material based on the total solid content of the negative electrode active material layer is desirably set at 85 to 98 mass % (e.g., 90 to 95 mass %).

The negative electrode active material layer can contain, other than the negative electrode active material (particle) formed of a graphite type carbon material, additives such as a conductive material, a binder, and a thickener, if necessary. The conductive material will be described later. As the binder, the one which can be contained in the positive electrode active material layer can be desirably used. Whereas, as the thickener, carboxyl methyl cellulose (CMC) or methyl cellulose (MC) can be desirably used.

In the lithium ion secondary battery herein disclosed, the negative electrode active material layer contains therein a conductive carbon material formed of a conductive amorphous carbon as a conductive material in combination with the negative electrode active material formed of a graphite type carbon material. Herein, the amorphous carbon is the generic name for carbons not exhibiting a clear crystal state, and includes coal, charcoal, soot, or the like. The material referred to as amorphous carbon is also a typical example included in amorphous carbons.

As the conductive carbon materials, various carbon materials formed of amorphous carbons such as soot can be adopted. From the viewpoint of ease of adjustment of the conductivity or the fine configuration (such as particle size or structure), various carbon blacks are desirably used. For example, carbon blacks excellent in conductivity such as furnace black and acetylene black can be desirably used as the conductive carbon materials for practicing the present teaching.

The conductive carbon material to be used has a bulk density of 0.4 g/cm$^3$ or less (e.g., 0.05 g/cm$^3$ or more and 0.4 g/cm$^3$ or less), which is smaller than the bulk density of the negative electrode active material (graphite type carbon material) allowed to coexist in the negative electrode active material layer. As a result, the pore volume in the negative electrode active material layer can be ensured relatively larger. Such a bulk density is desirably 0.3 g/cm$^3$ or less (e.g., 0.05 g/cm$^3$ or more and 0.3 g/cm$^3$ or less), and in particular desirably 0.2 g/cm$^3$ or less (e.g., 0.05 g/cm$^3$ or more and 0.2 g/cm$^3$ or less).

Whereas, the conductive carbon material to be used properly has a BET specific surface area of 50 m$^2$/g or less (e.g., 14 m$^2$/g or more and 50 m$^2$/g or less). This suppresses the occurrence of the side reaction during high-rate charging/discharging (e.g., the decomposition reaction of the electrolyte in the negative electrode active material layer during charging). Thus, the high-rate cycle characteristic is further improved (e.g., the increase in IV resistance after high-rate cycle can be suppressed.). Such a BET specific surface area is desirably 35 m$^2$/g or less (e.g., 14 m$^2$/g or more and 35 m$^2$/g or less), and in particular desirably 20 m$^2$/g or less (e.g., 14 m$^2$/g or more and 20 m$^2$/g or less).

The conductive carbon material for use as the conductive material has no particular restriction on the desirable size (the particle size of the primary particle). For example, it is possible to desirably use carbon black having an average particle size of the primary particle based on electron microscope (TEM or SEM) photograph of about 10 nm or more and 500 nm or less (typically, 20 nm or more and 200 nm or less).

Although not particularly restricted, the content of the conductive carbon material in the negative electrode active material layer is desirably 2 parts by mass or more and 10 parts by mass or less based on the total solid content of the negative electrode active material layer taken as 100 parts by mass. Such content can achieve the compatibility between the suppression of the lithium salt concentration variation, and the suppression of the reduction of the battery capacity (discharge capacity) due to addition of the conductive carbon material to the negative electrode active material layer in a good balance. Particularly, the content of the conductive carbon material based on the total solid content of the negative electrode active material layer taken as 100 parts by mass is desirably 5 parts by mass or more and 10 parts by mass or less (e.g., 5 parts by mass or more and 7 parts by mass or less, or 7 parts by mass or more and 10 parts by mass or less).

When carbon black is selected as the conductive carbon material, desirably, the conductive carbon material is furnace black, and the furnace black has a bulk density of 0.02 $g/cm^3$ or more and 0.04 $g/cm^3$ or less.

When the furnace black having such a bulk density is used, from the viewpoint of suppressing the side reaction at a high level while obtaining the effects resulting from the addition of the furnace black (particularly, the salt concentration variation suppressing effect) at a high level, the mass ratio between the negative electrode active material and the furnace black (negative electrode active material/furnace black) desirably falls within the range of 96.6/2 to 88.6/10, and more desirably falls within the range of 95.6/3 to 93.6/5.

The negative electrode active material layer 24 can be formed in the following manner: the negative electrode active material (graphite type carbon material) and the conductive material (conductive carbon material) are mixed with various other additives to prepare a composition (e.g., a slurry-like composition prepared by adding an aqueous solvent or a non-aqueous solvent thereto); and the resulting composition is deposited on the negative electrode collector with a prescribed thickness.

Examples of the additive may include a binder. For example, the same ones as those included in the positive electrode active material layer 14 can be used. As other additives, a thickener, a dispersant, and the like can also be appropriately used. For example, as the thickener, carboxyl methyl cellulose (CMC) or methyl cellulose (MC) can be desirably used.

Then, the separator 40 to be stacked with the positive electrode sheet 10 including the positive electrode active material layer 14 formed therein, and the negative electrode sheet 20 including the negative electrode active material layer 24 formed therein is a member for separating the positive electrode sheet 10 and the negative electrode sheet 20.

Typically, the separator 40 is formed of a band sheet material with a prescribed width, having a plurality of fine pores. A separator of a monolayer structure or a separator of a multilayer structure formed of, for example, a porous polyolefin type resin can be used for the separator 40. Further, a layer of particles having an insulation property may be further formed on the surface of the sheet material formed of such a resin. Herein, the particles having an insulation property may be formed of an inorganic filler having an insulation property (e.g., a filler such as a metal oxide or a metal hydroxide), or resin particles having an insulation property (e.g., particles of polyethylene or polypropylene).

For stacking, the positive electrode sheet 10 and the negative electrode sheet 20 are stacked in relation slightly deviated from each other in the width direction so that the positive electrode active material layer non-formation part 16 of the positive electrode sheet 10 and the negative electrode active material layer non-formation part 26 of the negative electrode sheet 20 protrude from both sides in the width direction of the separator sheets 40, respectively. The stacked sheets are wound in the sheet longitudinal direction. As a result, in the transverse direction with respect to the winding direction of the wound electrode body 80, the active material layer non-formation parts 16 and 26 of the positive electrode sheet 10 and the negative electrode sheet 20 respectively protrude from the winding core portion (i.e., the densely wound portion of the positive electrode active material layer formation part of the positive electrode sheet 10, the negative electrode active material layer formation part of the negative electrode sheet 20, and two separator sheets 40) outwardly. To such a positive electrode side protruding portion (i.e., the non-formation part of the positive electrode active material layer) 16 and the negative electrode side protruding portion (i.e., the non-formation part of the negative electrode active material layer) 26, a positive electrode lead terminal 74 and a negative electrode lead terminal 76 are attached, respectively, and are electrically connected with the positive electrode terminal 70 and the negative electrode terminal 72, respectively.

As the electrolyte (non-aqueous electrolyte), the same ones as the non-aqueous electrolytes conventionally used for the lithium ion secondary battery can be used without particular restriction. Such a non-aqueous electrolyte typically has a composition in which a supporting salt (lithium salt) is contained in an appropriate non-aqueous solvent.

As the non-aqueous solvent, there can be used one, or two or more selected from the group consisting of, for example, ethylene carbonate, propylene carbonate, dimethyl carbonate, diethyl carbonate, ethyl methyl carbonate, 1,2-dimethoxyethane, 1,2-diethoxyethane, tetrahydrofuran, and 1,3-dioxolane.

Whereas, as the supporting salt, there can be used lithium salts such as $LiPF_6$, $LiBF_4$, $LiAsF_6$, $LiCF_3SO_3$, $LiC_4FgSO_3$, $LiN(CF_3SO_2)_2$, and $LiC(CF_3SO_2)_3$. As one example, mention may be made of a non-aqueous electrolyte obtained by allowing a mixed solvent of ethylene carbonate (EC), dimethyl carbonate (DMC), and ethyl methyl carbonate (EMC) (e.g., a volume ratio of 3:4:3) to contain $LiPF_6$ in a concentration of about 1 mol/L.

For assembly of a lithium ion secondary battery, the wound electrode body 80 is accommodated from the upper end opening of the case main body 52 into the main body 52. In addition, an appropriate non-aqueous electrolyte is disposed (injected) into the case main body 52. Then, the opening is sealed by welding with the lid body 54, or the like, resulting in the completion of assembly of the lithium ion secondary battery 100 in accordance with the present embodiment. The sealing process of the case 50, and the disposition (injection) process of the electrolyte may be the same as the methods performed in manufacturing of a related-art lithium ion secondary battery, and do not feature the present teaching. In this manner, the construction of the lithium ion secondary battery 100 in accordance with the present embodiment is completed.

Below, some test examples related to the present teaching will be described, but are not intended to restrict the present teaching to those shown in the test examples.

Manufacturing of Lithium Ion Secondary Battery (Sample Battery for Evaluation)

Example 1

A lithium ion secondary battery of Example 1 was manufactured using the following materials.

(1) Manufacturing of Positive Electrode Sheet:

A ternary positive electrode active material ($LiNi_{1/3}Co_{1/3}Mn_{1/3}O_2$) having an average particle size of about 10 μm, a conductive material (carbon black), and a binder (PVDF) were mixed at such a mass ratio that positive electrode active material:conductive material:binder=90:8:2. Further, the resulting mixture was mixed with N-methyl pyrrolidone (NMP) so that the solid content thereof was 56 mass % based on the total amount, thereby to prepare a paste-like composition for forming a positive electrode active material layer (which will be hereinafter referred to as a "positive electrode mixture"). Then, such a positive electrode mixture was coated on both surfaces of the positive electrode collector formed of an aluminum foil sheet with a thickness of 15 μm, followed by drying and pressing. This resulted in manufacturing of a long positive electrode sheet with an overall thickness of 65 μm, in which positive electrode active material layers each having a width of 98 mm, and a length of 3000 mm were formed on both surfaces of the collector, respectively.

(2) Manufacturing of Negative Electrode Sheet:

A proper amount of pitch was added to and mixed with 100 g of a graphite material. The resulting sample was fired at a high temperature region of 500° C. or more and 800° C. or less, and crushed and classified. This resulted in preparation of an amorphous carbon-coated graphite type carbon material adjusted to have an average particle size of about 10 μm, a bulk density of 0.6 g/cm$^3$, and a BET specific surface area of 4 m$^2$/g.

Further, carbon black (furnace black) with an average particle size (primary particle size) of 100 nm or less, adjusted to have a bulk density of 0.05 g/cm$^3$, and a BET specific surface area of 14 m$^2$/g was prepared as a conductive material (conductive carbon material).

Then, in order that the mass ratio of the prepared negative electrode active material (graphite type carbon material), the conductive material (conductive carbon material), styrene butadiene rubber (SBR) as a binder, and carboxyl methyl cellulose (CMC) as a thickener should be negative electrode active material:conductive material:binder:thickener=93.6:5.0:0.7:0.7, first, the negative electrode active material and the conductive material were mixed with stirring. Further, the binder, the thickener, and water were added and mixed thereto. This resulted in preparation of a paste-like composition for forming a negative electrode active material layer (which will be hereinafter referred to as a "negative electrode mixture"). Then, such a negative electrode mixture was applied on both surfaces of the negative electrode collector with a thickness of 14 μm, formed of a copper foil sheet, followed by drying and pressing. This resulted in manufacturing of a long negative electrode sheet with an overall thickness of 150 μm, in which negative electrode active material layers each having a width of 102 mm and a length of 3100 mm were formed on both surfaces of the collector. As apparent from the description up to this point, in the present Example, the content of the conductive carbon material in the negative electrode active material layer is 5 parts by mass based on the total solid content of the negative electrode active material layer taken as 100 parts by mass.

(3) Construction of Battery

There were prepared two separator sheets each with an overall thickness of 24 μm, in each of which a heat-resistant layer (HRL layer) with a thickness of 4 μm, including an inorganic filler (herein, alumina particles) and a binder was formed at one side of a separator base material formed of a three-layer structure of polypropylene (PP)/polyethylene (PE)/polypropylene (PP) with a thickness of 20 μm and a pore size of 0.1 μm.

Then, the positive electrode sheet and the negative electrode sheet were stacked via the two separator sheets, and the stacked sheets were wound elliptically. The side surface of the resulting wound body was applied with a pressure of about 4 kN/cm$^2$ (was pressed) for about two minutes by a flat plate or the like under ordinary temperatures. As a result, a flat wound electrode body was manufactured.

At the positive electrode active material layer non-formation part and the negative electrode active material layer non-formation part of the wound electrode body, a positive electrode lead terminal and a negative electrode lead terminal were attached, respectively, by an ultrasonic welding means. Then, such a wound electrode body was accommodated with a non-aqueous electrolyte in a box battery container. The opening of the battery container was airtightly sealed. As the non-aqueous electrolyte, there was used 41 g of a non-aqueous electrolyte obtained by allowing a mixed solvent including EC, DMC, and EMC in a volume ratio of 3:4:3 to contain $LiPF_6$ in a concentration of about 1 mol/L as a supporting salt.

The sealed square lithium ion secondary battery thus constructed was subjected to an initial charging/discharging treatment (conditioning) with an ordinary method, resulting in a lithium ion secondary battery for evaluation with a rated capacity of 3.6 Ah (Example 1).

Examples 2 to 8 and Comparative Examples 1 and 2

Lithium ion secondary batteries for evaluation (Examples 2 to 8, and Comparative Examples 1 and 2) were manufactured for their corresponding used conductive materials, respectively, with the same materials and the same process as those of Example 1, except for using any of carbon blacks (furnace blacks) with an average particle size (primary particle size) of 100 nm or less, adjusted to have the bulk densities and the BET specific surface areas respectively shown in the corresponding columns of Table 1 below as a conductive material (conductive carbon material).

Example 9

A lithium ion secondary battery for evaluation (Example 9) was manufactured with the same materials and the same process as those of Example 1, except for using carbon black (furnace black) with an average particle size (primary particle size) of 100 nm or less, adjusted to have a bulk density: 0.4 g/cm$^3$, and a BET specific surface area: 50 m$^2$/g as a conductive material (conductive carbon material), and using an amorphous carbon-coated graphite type carbon material with an average particle size of about 10 m, adjusted to have a bulk density: 0.6 g/cm$^3$, and a BET specific surface area: 4.0 m$^2$/g as a negative electrode active material (graphite type carbon material).

Examples 10 to 13 and Comparative Examples 3 to 6

Lithium ion secondary batteries for evaluation (Examples 10 to 13, and Comparative Examples 3 to 6) were manufactured for their corresponding used negative active materials, respectively, with the same materials and the same process as those of Example 9, except for using any of amorphous carbon-coated graphite type carbon materials with an average particle size of 10 μm, adjusted to have the bulk densities and the BET specific surface areas respectively shown in the corresponding columns of Table 2 below as negative electrode active materials.

Example 14

A lithium ion secondary battery for evaluation (Example 14) was manufactured with the same materials and the same process as those of Example 9, except for preparing a negative electrode mixture by adjusting the amount of the conductive carbon material so that the content of the conductive carbon material in the negative electrode active material layer was 2 parts by mass based on the total solid content of the negative electrode active material layer taken as 100 parts by mass.

Example 15

A lithium ion secondary battery for evaluation (Example 15) was manufactured with the same materials and the same process as those of Example 9, except for preparing a negative electrode mixture by adjusting the amount of the conductive carbon material so that the content of the conductive carbon material in the negative electrode active material layer was 7 parts by mass based on the total solid content of the negative electrode active material layer taken as 100 parts by mass.

Example 16

A lithium ion secondary battery for evaluation (Example 16) was manufactured with the same materials and the same process as those of Example 9, except for preparing a negative electrode mixture by adjusting the amount of the conductive carbon material so that the content of the conductive carbon material in the negative electrode active material layer was 10 parts by mass based on the total solid content of the negative electrode active material layer taken as 100 parts by mass.

<Evaluation of High-Rate Cycle Characteristic (Resistance Increase Rate)>

For each of the lithium ion secondary batteries for evaluation (Examples 1 to 16 and Comparative Examples 1 to 6) manufactured in the foregoing manner, the resistance increase rate after a high-rate cycle test was relatively evaluated.

Specifically, a high-rate charging/discharging cycle treatment was performed in which under a temperature condition of 60° C., a treatment of charging each battery with a constant current of 36 A (equivalent to 10 C) until the inter-terminal voltage became 4.1 V, and a treatment of discharging each battery with a constant current of 1.8 A (equivalent to 0.5 C) until the inter-terminal voltage became 3.0 V were repeated a total of 1000 cycles.

After such a high-rate charging/discharging cycle treatment, each battery was charged under a temperature environment of 25° C., and was adjusted to a charging state of SOC of 60%. Then, 10-sec pulse discharging was performed with a current of 10 C. Thus, the IV resistance value (mΩ) after 1000-cycle treatments of high-rate charging/discharging of each lithium ion secondary battery for evaluation was determined from the voltage drop amount after 10 seconds from the start of discharging. Then, with the IV resistance value (mΩ) after the same cycles of the reference lithium ion secondary battery previously set as a target value taken as the reference IV resistance value=1, the IV resistance value of each lithium ion secondary battery for evaluation was specified as a relative value. Namely, the relative value of the IV resistance of each lithium ion secondary battery for evaluation was calculated by:

IV resistance measured value ($m\Omega$) after 1000-cycle treatments/reference IV resistance value ($m\Omega$).

The results are shown in the corresponding columns of Tables 1 and 2.

TABLE 1

| | BET ($m^2/g$) | Bulk density ($g/cm^3$) | Battery IV resistance after high-rate cycle (normalized with target value as 1) |
|---|---|---|---|
| Example 1 | 14 | 0.05 | 0.64 |
| Example 2 | 32 | 0.07 | 0.75 |
| Example 3 | 50 | 0.06 | 0.87 |
| Example 4 | 50 | 0.40 | 0.97 |
| Example 5 | 14 | 0.22 | 0.78 |
| Example 6 | 15 | 0.40 | 0.90 |
| Example 7 | 31 | 0.21 | 0.84 |
| Example 8 | 29 | 0.20 | 0.93 |
| Comparative Example 1 | 60 | 0.10 | 1.03 |
| Comparative Example 2 | 13 | 0.48 | 1.02 |

TABLE 2

| | BET ($m^2/g$) | Bulk density ($g/cm^3$) | Battery IV resistance after high-rate cycle (normalized with target value as 1) |
|---|---|---|---|
| Example 9 | 4.0 | 0.60 | 0.97 |
| Example 10 | 2.0 | 0.56 | 0.99 |
| Example 11 | 6.0 | 0.62 | 0.99 |
| Example 12 | 4.0 | 0.50 | 0.99 |
| Example 13 | 3.8 | 0.70 | 0.98 |
| Comparative Example 3 | 1.6 | 0.60 | 1.11 |
| Comparative Example 4 | 7.1 | 0.58 | 1.07 |
| Comparative Example 5 | 3.9 | 0.42 | 1.09 |
| Comparative Example 6 | 4.1 | 0.75 | 1.06 |
| Example 14 | 4.0 | 0.60 | 0.99 |
| Example 15 | 4.0 | 0.60 | 0.91 |
| Example 16 | 4.0 | 0.60 | 0.89 |

As shown in Tables 1 and 2, it was confirmed as follows: the lithium ion secondary batteries (Examples 1 to 16) including negative electrode active material layers formed of: negative electrode active materials (graphite type carbon materials) with a bulk density of 0.5 $g/cm^3$ or more and 0.7 $g/cm^3$ or less and a BET specific surface area of 2 $m^2/g$ or more and 6 $m^2/g$ or less; and conductive materials (conductive carbon materials) with a bulk density of 0.4 $g/cm^3$ or less and a BET specific surface area of 50 $m^2/g$ or less had IV resistance relative values, which were smaller than 1, which is the reference IV resistance value, and had high high-rate cycle characteristic (durability). This is specifically as follows.

For Examples 1 to 3 shown in Table 1, each conductive material had a bulk density of as particularly low as 0.1 g/cm$^3$ or less. This was combined with the BET specific surface area of as low as 50 m$^2$/g or less. As a result, the samples showed particularly high durability against high-rate charging/discharging. Further, the smaller the BET specific surface area was, the more the side reaction in the negative electrode (e.g., the decomposition reaction of the electrolyte in the negative electrode active material layer during charging) was suppressed. Thus, it can be said that the samples showed better results than that of Example 4.

Whereas, for Examples 5 and 6, each conductive material had a BET specific surface area of as particularly low as 20 m$^2$/g or less. This was combined with the bulk density of as low as 0.4 g/cm$^3$ or less. As a result, the samples showed favorable durability against high-rate charging/discharging. Further, the relative value of the IV resistance tended to decrease with a decrease in bulk density.

Further, also for Examples 7 and 8, each conductive material had a BET specific surface area of about 30±1 m$^2$/g, and a bulk density of as low as 0.2 to 0.21 g/cm$^3$. Accordingly, the samples showed favorable durability against high-rate charging/discharging.

On the other hand, it was confirmed as follows: for Comparative Example 1 using the conductive material having a low bulk density, but having a BET specific surface area of more than 50 m$^2$/g, and Comparative Example 2 using the conductive material having a low BET specific surface area, but having a bulk density of more than 0.4 g/cm$^3$, both the samples had relative values of the IV resistance of more than 1 of the reference IV resistance value, and were reduced in high-rate cycle characteristic (durability). For Comparative Example 1, the fact that too large specific surface area promoted the side reaction may be mentioned as the factors. Whereas, for Comparative Example 2, the fact that the pore volume of the negative electrode active material layer could not be ensured may be mentioned as the factor.

For Examples 9 to 13 shown in Table 2, each negative electrode active material had a bulk density and a BET specific surface area both within proper respective ranges. Accordingly, the samples showed favorable durability against high-rate charging/discharging.

Whereas, the results of Example 9, and Examples 14 to 16 indicate as follows: each sample showed better durability as the conductive carbon material content increased so long as the content of the conductive carbon material fell within the range of 2 parts by mass to 10 parts by mass based on the total solid content of the negative electrode active material layer taken as 100 parts by mass.

On the other hand, it was confirmed as follows: for Comparative Examples 3 to 6, all the samples had relative values of the IV resistance of more than 1 of the reference IV resistance value, and were reduced in high-rate cycle characteristic (durability). For Comparative Example 3, the small reaction area due to the too small BET specific surface area of the negative active material may be mentioned as the factor. For Comparative Example 4, the fact that too large BET specific surface area of the negative electrode active material promoted the side reaction may be mentioned as the factor. For Comparative Example 5, it can be considered as follows: the bulk density of the negative electrode active material was too small, and hence the charging/discharging capacity was small; accordingly, the load of the negative electrode increased, resulting in an increase in IV resistance when a large current was passed. Whereas, for Comparative Example 6, it can be considered as follows: the bulk density of the negative electrode active material was too large, and hence the pore volume of the negative electrode active material layer was small; as a result, the IV resistance increased due to the inhibition of diffusion of lithium ions, and an increase in lithium salt concentration variation.

Example 17

A lithium ion secondary battery for evaluation (Example 17) was manufactured with the same materials and the same process as those of Example 1, except for the following: for manufacturing a negative electrode sheet, furnace black adjusted to have a bulk density of 0.02 g/cm$^3$, and a BET specific surface area of 13 m$^2$/g was used as the conductive material (conductive carbon material); for preparing a negative electrode mixture, the mass ratio of respective components was set as the total of the negative electrode active material and the conductive material:binder:thickener=98.6:0.7:0.7 (herein, negative electrode active material:conductive material (mass ratio)=95:5); a copper foil sheet with a thickness of 10 μm was used as the negative electrode collector; and the overall thickness of the negative electrode sheet was adjusted to 75 μm.

Examples 18 to 21

Lithium ion secondary batteries for evaluation (Examples 18 to 21) were manufactured for their corresponding used negative active materials, respectively, with the same materials and the same process as those of Example 17, except for using any of furnace blacks adjusted to have the bulk densities and the BET specific surface areas respectively shown in the corresponding columns of Table 3 below as conductive materials (conductive carbon materials).

Examples 22 to 29

Lithium ion secondary batteries for evaluation (Examples 22 to 29) were manufactured with the same materials and the same process as those of Example 1, except for the following: any of amorphous carbon-coated graphite type carbon materials (described as "graphite" in Table 4) adjusted to have the bulk densities and the BET specific surface areas respectively shown in the corresponding columns of Table 4 below was used as the negative electrode active material; any of furnace blacks adjusted to have the bulk densities and the BET specific surface areas respectively shown in the corresponding columns of Table 4 below was used as the conductive material (conductive carbon material); a copper foil sheet with a thickness of 10 μm was used as the negative electrode collector; and the overall thickness of the negative electrode sheet was adjusted to 75 μm.

Examples 30 to 37

Lithium ion secondary batteries for evaluation (Examples 30 to 37) were manufactured with the same materials and the same process as those of Example 1, except for the following: any of amorphous carbon-coated graphite type carbon materials (described as "graphite" in Table 5) adjusted to have the bulk densities and the BET specific surface areas respectively shown in the corresponding columns of Table 5 below was used as the negative electrode active material; any of furnace blacks adjusted to have the bulk densities and the BET specific surface areas respectively shown in the corresponding columns of Table 5 below was used as the conductive material (conductive carbon material); the mixing ratio (mass ratio) of the amorphous carbon-coated graphite type carbon material and the furnace black was changed to each ratio shown in Table 5; a copper foil sheet with a thickness of 10 μm was used as the negative electrode collector; and the overall thickness of the negative electrode sheet was adjusted to 75 μm.

<Evaluation of High-Rate Cycle Characteristic (Resistance Increase Rate)>

For each of the lithium ion secondary batteries for evaluation (Examples 17 to 37) manufactured in the foregoing manner, the resistance increase rate after a high-rate cycle test was relatively evaluated.

Specifically, the IV resistance value (mΩ) after 1000-cycle treatments of high-rate charging/discharging of each lithium ion secondary battery for evaluation was determined by the method described above. Then, with the IV resistance value (mΩ) after the same cycles of the reference lithium ion secondary battery previously set as a target value taken as the reference IV resistance value=1, the IV resistance value of each lithium ion secondary battery for evaluation was calculated as a relative value. The results were shown in their respective corresponding columns of Tables 3 to 5. Incidentally, as the target value (reference IV resistance value) of Table 3, a value lower than the target values (reference IV resistance values) of Tables 1 and 2 by 40% is adopted. Whereas, as the target value (reference IV resistance value) of Table 4, a value lower than the target values (reference IV resistance value) of Tables 1 and 2 by 40% is adopted. Further, as the target value (reference IV resistance value) of Table 5, a value lower than the target values (reference IV resistance values) of Tables 1 and 2 by 40% is adopted.

TABLE 3

| | Particle to be mixed in graphite | Bulk density (g/cm$^3$) | BET (m$^2$/g) | Battery IV resistance after high-rate cycle (normalized with target value as 1) |
|---|---|---|---|---|
| Example 17 | Furnace Black | 0.02 | 13 | 0.64 |
| Example 18 | Furnace Black | 0.04 | 13 | 0.85 |
| Example 19 | Furnace Black | 0.04 | 32 | 0.90 |
| Example 20 | Furnace Black | 0.04 | 50 | 0.97 |
| Example 21 | Furnace Black | 0.02 | 50 | 0.77 |

TABLE 4

| | Furnace Black | | Graphite | | Battery IV resistance after high-rate cycle (normalized with target value as 1) |
|---|---|---|---|---|---|
| | Bulk density (g/cm$^3$) | BET (m$^2$/g) | Bulk density (g/cm$^3$) | BET (m$^2$/g) | |
| Example 22 | 0.02 | 13 | 0.5 | 2 | 0.61 |
| Example 23 | 0.04 | 13 | 0.5 | 2 | 0.81 |
| Example 24 | 0.02 | 13 | 0.5 | 6 | 0.62 |
| Example 25 | 0.04 | 13 | 0.5 | 6 | 0.80 |
| Example 26 | 0.02 | 50 | 0.7 | 2 | 0.78 |
| Example 27 | 0.04 | 50 | 0.7 | 2 | 0.98 |
| Example 28 | 0.02 | 50 | 0.7 | 6 | 0.79 |
| Example 29 | 0.04 | 50 | 0.7 | 6 | 0.97 |

TABLE 5

| | Furnace Black | | Graphite | | Mixing ratio | | Battery IV resistance after high-rate cycle (normalized with target value as 1) |
|---|---|---|---|---|---|---|---|
| | Bulk density (g/cm$^3$) | BET (m$^2$/g) | Bulk density (g/cm$^3$) | BET (m$^2$/g) | Graphite | Furnace Black | |
| Example 30 | 0.04 | 50 | 0.7 | 6 | 96.6 | 7 | 1.00 |
| Example 31 | 0.04 | 50 | 0.7 | 6 | 95.6 | 3 | 0.99 |
| Example 32 | 0.04 | 50 | 0.7 | 6 | 93.6 | 5 | 0.97 |
| Example 33 | 0.04 | 50 | 0.7 | 6 | 88.6 | 10 | 0.94 |
| Example 34 | 0.02 | 13 | 0.7 | 6 | 96.6 | 2 | 0.96 |
| Example 35 | 0.02 | 13 | 0.7 | 6 | 95.6 | 3 | 0.88 |
| Example 36 | 0.02 | 13 | 0.7 | 6 | 93.6 | 5 | 0.64 |
| Example 37 | 0.02 | 13 | 0.7 | 6 | 88.6 | 10 | 0.58 |

As shown in Tables 3 to 5, it was confirmed as follows. From among the lithium ion secondary batteries including negative electrode active material layers formed of: negative electrode active materials (graphite type carbon materials) with a bulk density of 0.5 g/cm$^3$ or more and 0.7 g/cm$^3$ or less and a BET specific surface area of 2 m$^2$/g or more and 6 m$^2$/g or less; and conductive materials (conductive carbon materials) with a bulk density of 0.4 g/cm$^3$ or less and a BET specific surface area of 50 m$^2$/g or less, the lithium ion secondary batteries (examples 17 to 37) in which the conductive carbon material (carbon black) was furnace black and in which the furnace black had a bulk density of 0.02 g/cm$^3$ or more and 0.04 g/cm$^3$ or less, had a particularly low relative value of the IV resistance, and a particularly high high-rate cycle characteristic (durability). This is specifically as follows.

Examples 17 to 21 of Table 3 indicate as follows. By using furnace black with a bulk density of 0.02 g/cm$^3$ or more and 0.04 g/cm$^3$ or less, and a BET specific surface area of 50 m$^2$/g or less, it is possible to acquire a particularly high high-rate cycle characteristic (durability). As apparent from comparison between Examples 17 and 18, and between Examples 20 and 21, the smaller the bulk density was, the more the high-rate cycle characteristic was improved. This can be considered due to the following: when the bulk density is small, the pore volume of the negative electrode tends to be sufficiently ensured; accordingly, the salt concentration variation can be more suppressed. Whereas, comparison among Examples 18 to 20 indicates that the high-rate cycle characteristic tends to be more improved with a decrease in BET specific surface area. This can be considered due to the fact that the side reaction was more suppressed.

Examples 22 to 29 of Table 4 indicate as follows. By using a negative electrode active material (graphite type carbon material) with a bulk density of 0.5 g/cm$^3$ or more and 0.7 g/cm$^3$ or less, and a BET specific surface area of 2 m$^2$/g or more and 6 m$^2$/g or less, and furnace black with a bulk density of 0.02 g/cm$^2$ or more and 0.04 g/cm$^3$ or less, and a BET specific surface area of 50 m$^2$/g or less, it is possible to acquire a particularly high high-rate cycle characteristic (durability). Table 4 also shows as follows. The smaller the bulk density of furnace black was, the more the high-rate cycle characteristic tended to be improved. Further, the smaller the BET specific surface area of furnace black was, the more the high-rate cycle characteristic tended to be improved.

Examples 30 to 37 of Table 5 indicate as follows. By using a negative electrode active material (graphite type carbon material) with a bulk density of 0.5 g/cm$^3$ or more and 0.7 g/cm$^3$ or less, and a BET specific surface area of 2 m$^2$/g or more and 6 m$^2$/g or less, and furnace black with a bulk density of 0.02 g/cm$^3$ or more and 0.04 g/cm$^3$ or less, and a BET specific surface area of 50 m$^2$/g or less, it is possible to acquire a particularly high high-rate cycle characteristic (durability). Table 5 also shows as follows. The smaller the bulk density of furnace black was, and the smaller the BET specific surface area of furnace black was, the more the high-rate cycle characteristic tended to be improved. Further, the larger the amount of furnace black was, the more the high-rate cycle characteristic tended to be improved. This can be considered due to the following: with an increase in amount of furnace black, the pore volume increases; accordingly, the salt concentration variation is more likely to be suppressed.

Up to this point, the present teaching was described in details. However, the embodiments are only examples. The teachings herein disclosed include those obtained by variously modifying or changing the specific examples. The lithium ion secondary battery herein disclosed exhibits excellent high-rate cycle characteristic as described above, and hence, can be desirably used as, for example, a vehicle driving power source.

What is claimed is:

1. A lithium ion secondary battery comprising:
   an electrode body including a positive electrode provided with a positive electrode active material layer on a positive electrode collector, and a negative electrode provided with a negative electrode active material layer on a negative electrode collector; and
   a non-aqueous electrolyte,
   the negative electrode active material layer including: a negative electrode active material, and a conductive carbon material which is different from the negative electrode active material,
   wherein the conductive carbon material comprises at least one kind of carbon black,
   the negative electrode active material consists essentially of a graphite material coated at least partially with a layer of amorphous carbon,
   the negative electrode active material has a bulk density of 0.5 g/cm$^3$ or more and 0.7 g/cm$^3$ or less, and a BET specific surface area of 2 m$^2$/g or more and 6 m$^2$/g or less,
   the conductive carbon material has a bulk density of 0.4 g/cm$^3$ or less, and a BET specific surface area of 50 m$^2$/g or less, and
   the negative electrode active material layer is obtained by (i) intimately mixing particles of the graphite material coated at least partially with the layer of amorphous carbon, particles of the at least one kind of carbon black, a binder, and a solvent to obtain a composition and (ii) depositing the composition on the negative electrode current collector, such that the particles of the at least one kind of carbon black are present in the negative electrode active material layer as particles that are separate and distinct from the particles of the graphite material coated at least partially with the layer of the amorphous carbon.

2. The lithium ion secondary battery according to claim 1, wherein the content of the conductive carbon material in the negative electrode active material layer is 2 parts by mass or more and 10 parts by mass or less, based on a total solid content of the negative electrode active material layer taken as 100 parts by mass.

3. The lithium ion secondary battery according to claim 1, wherein
   the conductive carbon material is furnace black, and
   the furnace black has a bulk density of 0.02 g/cm$^3$ or more and 0.04 g/cm$^3$ or less.

4. The lithium ion secondary battery to claim 1, wherein
   the positive electrode collector and the negative electrode collector are long sheet-shaped positive electrode sheet and negative electrode sheet, respectively, and
   the electrode body is a wound electrode body in which the positive electrode sheet and the negative electrode sheet are stacked with a separator interposed therebetween and wound.

5. The lithium ion secondary battery to claim 1, wherein
   the graphite material is in the form of particles having an average particle size of 1 to 50 μm, and
   the conductive carbon material is in the form of particles having an average particle size of 10 to 500 nm.

6. The lithium ion secondary battery to claim 1, wherein
the graphite material is in the form of particles having an average particle size of 5 to 20 μm, and
the conductive carbon material is in the form of particles having an average particle size of 20 to 200 nm.

7. The lithium ion secondary battery to claim 1, wherein
the graphite material is in the form of particles having an average particle size of 8 to 12 μm, and
the conductive carbon material is in the form of particles having an average particle size of 20 to 200 nm.

8. The lithium ion secondary battery to claim 1, wherein
the graphite material is in the form of particles of graphite coated with a layer of an amorphous carbon having an average particle size of 1 to 50 μm,
the conductive carbon material is in the form of particles having an average particle size of 10 to 500 nm.

9. The lithium ion secondary battery to claim 1, wherein
the graphite material is in the form of particles of graphite coated with a layer of an amorphous carbon having an average particle size of 5 to 20 μm,
the conductive carbon material is in the form of particles having an average particle size of 20 to 200 nm.

10. The lithium ion secondary battery to claim 1, wherein
the graphite material is in the form of particles of graphite coated with a layer of an amorphous carbon having an average particle size of 8 to 12 μm,
the conductive carbon material is in the form of particles having an average particle size of 20 to 200 nm.

* * * * *